Sept. 29, 1931.　　　　G. F. PFEIFFER　　　　1,825,475
PREPARATION OF MINERAL FEEDS
Filed Feb. 11, 1928　　　2 Sheets-Sheet 1
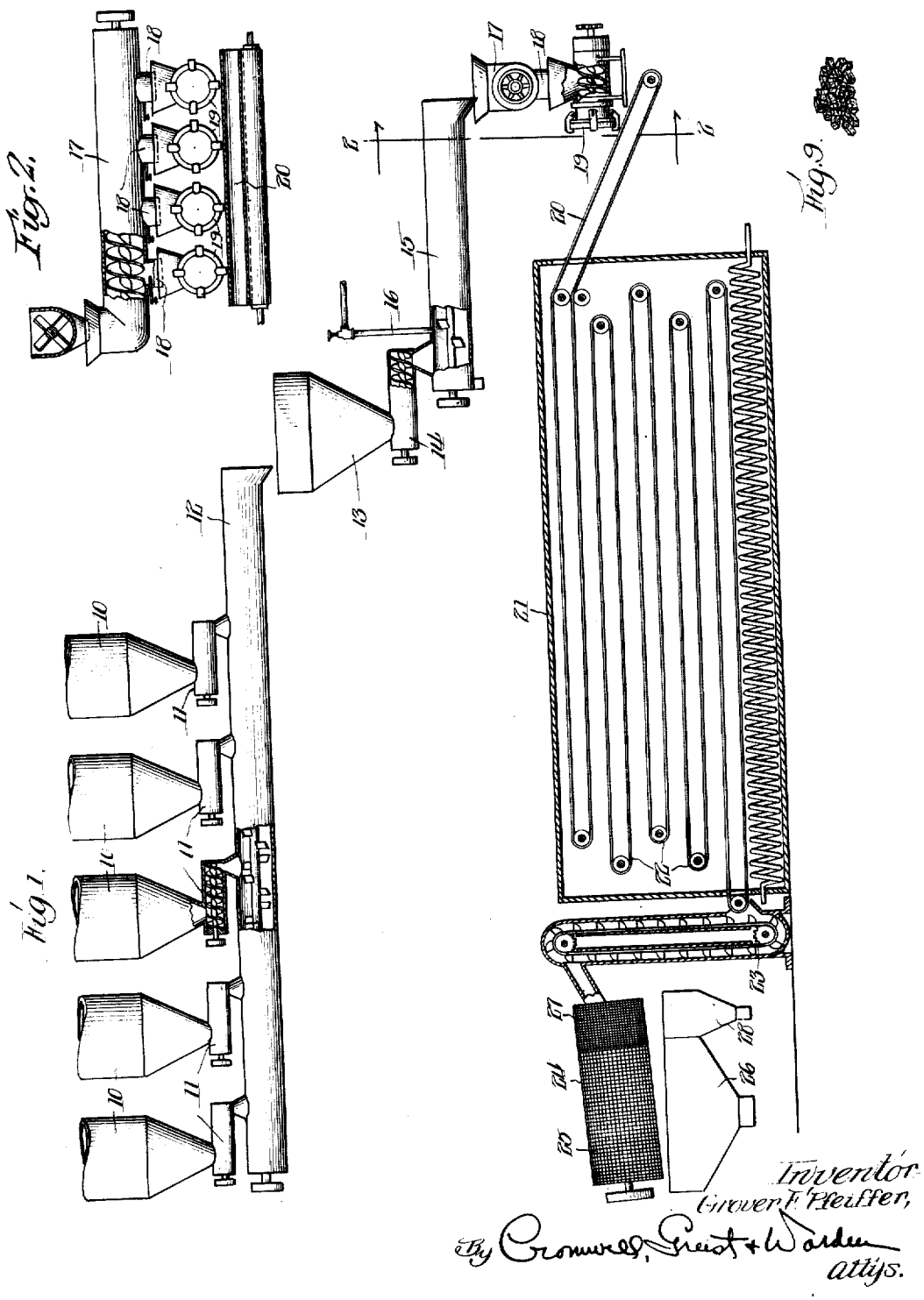

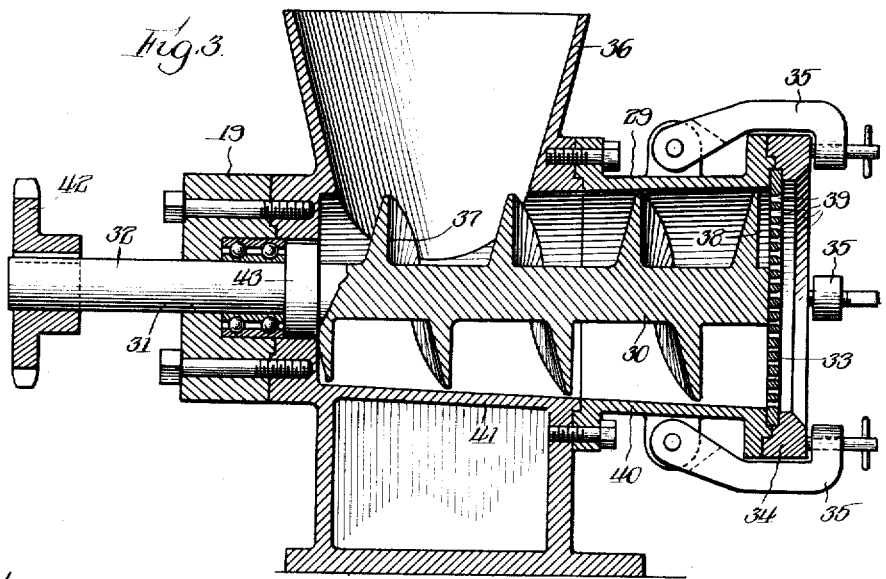
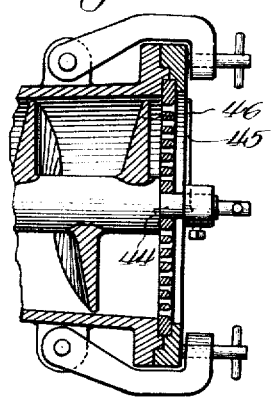
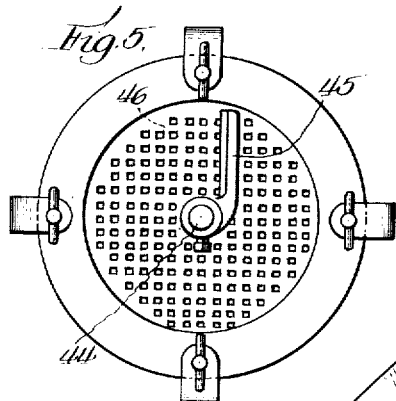
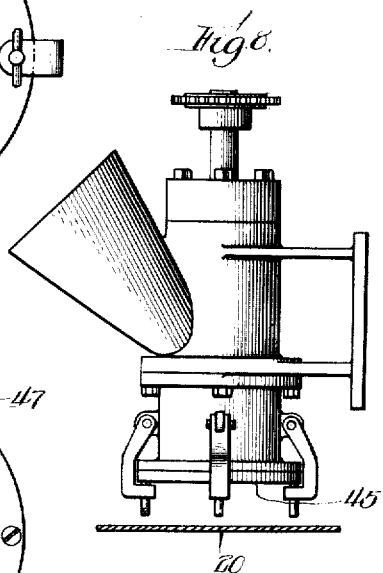
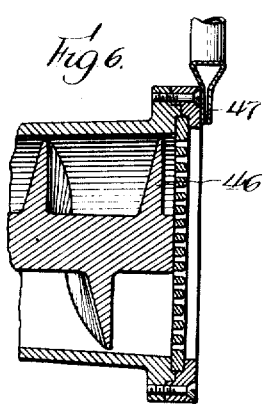
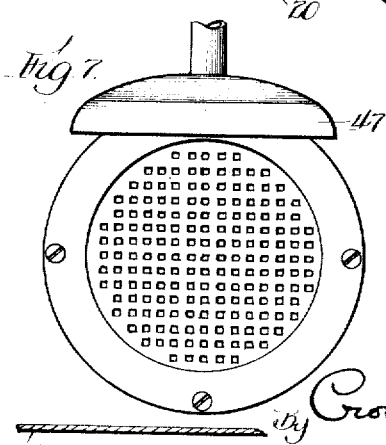

Patented Sept. 29, 1931

1,825,475

UNITED STATES PATENT OFFICE

GROVER F. PFEIFFER, OF QUINCY, ILLINOIS, ASSIGNOR TO MOORMAN MANUFACTURING COMPANY, OF CHICAGO, ILLINOIS, A CORPORATION OF ILLINOIS

PREPARATION OF MINERAL FEEDS

Application filed February 11, 1928. Serial No. 253,573.

This invention has to do with the preparation of mineral feeds, and is concerned particularly with the preparation of granulated, as distinguished from powdered, mineral feeds.

Granulated mineral feeds, such as those disclosed in Patents Nos. 1,649,123 and 1,637,428, are superior in many respects to powdered mineral feeds. They are easy for the stock to pick up; they will not blow away; they do not tend to stratify when mixed with grain or other stock feed; they are cleaner to handle; and the bags in which they are shipped do not need to be lined.

The matter of making up mineral feeds in granulated form is something, however, which has given those skilled in the art considerable concern, since the apparatus and process employed must be such that the mineral feed can be formed up into fairly uniform granules without including too high a percentage of fine particles which require reprocessing; the processing must be such as to permit of quantity production; and the cost of processing must not greatly exceed that of preparing mineral feeds in ordinary powdered form. The purpose of this invention, generally stated, is to present a commercially practicable solution of these difficulties.

One object of the invention is to provide a novel apparatus which can be used to make up mineral feeds in fairly uniform granules without too high a percentage of fine particles which must be done over, which is capable of producing the granules in large quantities, and which is inexpensive to construct, operate and maintain.

Another object is to provide a novel process of preparing mineral feeds in granulated form.

Still another object is to provide a granulated mineral feed in which the granules are of a novel and highly advantageous shape.

While the foregoing statements are indicative in a general way of the nature of the invention, other objects and advantages will occur to those skilled in the art upon a full understanding of the product, the process and the construction, arrangement and operation of the apparatus.

One form of apparatus embodying the invention is presented herein for the purpose of exemplification, but it will of course be understood that the invention is susceptible of embodiment in other forms coming equally within the scope of the appended claims.

In the accompanying drawings:

Fig. 1 is a schematic view illustrative of an apparatus which is constructed in accordance with the invention;

Fig. 2 is a vertical section through the apparatus, taken on the line 2—2 of Fig. 1;

Fig. 3 is a vertical longitudinal section through that portion of the apparatus hereinafter referred to as the forming device;

Fig. 4 is a fragmentary vertical longitudinal section, showing a modification of the forming device;

Fig. 5 is an end view of the modification shown in Fig. 4;

Fig. 6 is a fragmentary vertical longitudinal section, showing another modification of the forming device;

Fig. 7 is an end view of the modification shown in Fig. 6;

Fig. 8 is a side view, showing still another modification of the forming device; and Fig. 9 shows a small quantity of mineral feed which has been processed in accordance with the invention.

The apparatus shown in Figs. 1 and 2 includes a battery of hoppers 10 into which are dumped the various dry constituents which go to make up the mineral feed. In the case of the particular mineral feed disclosed in Patent No. 1,637,428, such dry constituents would be treated with rock phosphate, limestone, salt cake, charcoal and common salt.

The hoppers 10 are provided with measuring devices 11 which discharge the ingredients in proper proportion into a trough 12, where the ingredients are thoroughly mixed while dry. The trough 12 discharges the dry mixture continuously into a hopper 13, and the hopper 13 is provided with a measuring device 14 which in turn discharges the dry mixture into a trough 15. The water or other liquid used to moisten the dry mixture is also discharged into the trough 15 through a conduit 16.

The dry mixture and the water are thoroughly mixed in the trough 15, and the moistened mixture is discharged from the trough 15 into a distributing trough 17. The trough 17 is provided with several suitably controlled outlets 18 through which the moistened mixture is discharged into a battery of devices 19, where the mixture is shaped under pressure into homogeneous granules of the desired shape and size. The granules are deposited by the forming devices 19 onto an endless conveyor 20 which moves beneath the same, and are carried by the conveyor without disturbance into a heated casing 21, where they are dried and hardened, the granules, after the initial setting action produced by the heat, being transferred from the conveyor 20 to a series of conveyors 22. When the granules reach the discharge end of the lowermost conveyor, they are transferred to a device 23 which elevates them into a slightly inclined rotating screen cylinder 24, where any fine particles of the mineral feed not formed up into granules of the proper size by the apparatus are separated from the granules of proper size. The granules of proper size pass through a coarse mesh screen 25 which covers the lower end of the cylinder, and drop into a hopper 26 from which they are bagged or removed in bulk, while the fine particles pass through a fine mesh screen 27 and drop into a small hopper 28.

The granules into which the powdered ingredients of the mineral feed are formed are preferably flat sided, of slightly greater length than width, and of about the size of grains of corn. A granule of the type described which is square in cross section and which measures from about $1/8''$ to $1/4''$ in width and from about $1/16''$ to $3/8''$ in length possesses several special advantages.

Mineral feed, when processed in accordance with the present invention, is easy for the stock to pick up even when dumped on a flat unrestricted surface, since it is not unlike grain in certain respects. It is economical in use because there is practically no waste such as there is with powdered mineral feeds which blow away and stick to the wet snouts and feet of the stock. It will not settle to the bottom when mixed with any other solid stock feeds such as grain. It is clean to handle as it does not give off dust or stick to articles with which it comes into contact. Furthermore, it may be shipped economically in ordinary coarse mesh unlined bags.

The forming device 19, which is shown in detail in Fig. 3, consists of a casing 29 having a circular bore which is occupied by an auger 30. One end of the casing is closed and forms a bearing 31 through which a shaft 32 on that end of the auger extends, and the other end of the casing is open and has mounted therein a die plate 33 which is held against the end of the casing by a retaining ring 34 secured by clamps 35. The moistened mineral feed enters the casing 29 through a hopper 36 in the top of the same, and is moved endwise of the casing toward the die plate by a helical rib 37 on the auger. The rib decreases in pitch toward the die plate, and the front operative face of the rib is straight, instead of inclined, with respect to the axis of the auger. The bore of the casing preferably increases in diameter toward the die plate, and the rib 37 likewise increases in diameter, whereby to produce a close fit between the auger and the casing. The lip 38 on the rib of the auger preferably terminates in slightly spaced relation to the plate 33, and the moistened mineral feed is expressed by the lip through a large number of square apertures 39 in the plate. The apertures 39 taper slightly toward the outer face of the plate in order to relieve the pressure or friction on the material after it has once started to pass through the plate. The slight taper also has a tendency to give the extruded material a slick surface, which is desirable.

The casing 29 is preferably made up into two sections 40 and 41 which are bolted together, whereby to permit the section 40, which is subjected to the greatest wear and stress, to be replaced should occasion require. The auger 30 is driven by a sprocket wheel 42 which is mounted on the outer end of the shaft 32, and the shaft is provided inside the casing with a collar 43 which is so designed as to take up the end thrust developed in the operation of the auger.

In Figs. 4 and 5 is shown a modification of the forming device in which an extension 44 is provided on the end of the auger and a finger 45 is secured to the extension in spaced relation to the outer face of the die plate. The finger 45 is so arranged as to follow closely after the lip 46 of the auger and break up into the desired lengths the material extruded through the apertures in the plate, thereby preventing the formation of undesirably long granules.

In Figs. 6 and 7 is shown another modification of the forming device in which the material is prevented from being formed into undesirably long granules by means of a flat air jet which is discharged from a nozzle 47 adjacent the die plate and moves in spaced parallel relation to the same, breaking off into the desired granule length any strings of the mineral feed which tend to continue unbroken as far out as the plane of the jet. The air jet serves the same general purpose as the finger 45 in the modification shown in Figs. 4 and 5.

In Fig. 8 is shown still another modification of the forming device which differs from that shown in Figs. 4 and 5 in that the axis of the device is arranged vertically rather than horizontally, so that the granules as they are formed will drop straight down onto the conveyor 20, which conveyor is arranged as close to the face of the die plate as practicable in order to reduce to a minimum the length of drop. Such vertical arrangement permits each of the granules to drop directly to the conveyor without falling first against the other granules, as is to a certain extent the case in the modifications previously described, and as a result, the proportion of fine particles included with the granules is reduced to a minimum.

One of the most important process features of the invention is that involved in drying and hardening the globules on the same surface as that on which they are deposited by the forming device, while in an extremely fragile condition. Another important process feature resides in the sequence of steps whereby the dry ingredients are first thoroughly mixed, after which the dry mixture is in turn thoroughly mixed with the water or other liquid used to moisten the same.

I claim:

1. A device for forming a mixture of moistened mineral feed ingredients into granules, characterized by an apertured die plate, means for forcing the material through the apertures in the plate under pressure, and means beneath the plate closely adjacent the same for receiving without breakage the granules into which the mineral feed is shaped as it passes through the apertures.

2. A device for forming a mixture of moistened mineral feed ingredients into granules, characterized by an apertured die plate, means for forcing the material through the apertures in the plate under pressure, means beneath the plate for receiving the granules into which the mineral feed is shaped as it passes through the apertures, and means for drying the granules while on said last mentioned means.

3. A device for forming a mixture of moistened mineral feed ingredients into granules, characterized by a die plate having apertures which increase in area toward one face of the plate, means for forcing the mixture through the apertures in the plate under pressure in a direction toward that face of the plate, and means beneath the plate for receiving the granules into which the mineral feed is shaped as it passes through the apertures.

4. A device for forming a mixture of moistened mineral feed ingredients into granules, characterized by a casing, an apertured die plate in one part of the casing, and an auger in the casing for forcing the mixture of moistened mineral feed ingredients through the apertures in the plate, said auger having a feeding rib the front surface of which is perpendicular to the axis of the auger and the rear surface of which is inclined.

5. A device for forming a mixture of moistened mineral feed ingredients into granules, characterized by a casing, an apertured die plate in one part of the casing, and an auger in the casing for forcing the mixture of moistened mineral feed ingredients through the apertures in the plate, said auger having a feeding rib the front surface of which is perpendicular to the axis of the auger and the rear surface of which is inclined, and said rib having a lip which terminates in spaced relation to the die plate.

6. A device for forming a mixture of moistened mineral feed ingredients into granules, characterized by an elongated casing having a smooth bore which increases in diameter toward one end, an apertured die plate at that end of the casing, and an auger in the casing for forcing the mixture of moistened mineral feed ingredients through the apertures in the plate, said auger likewise increasing in diameter toward that end of the casing and having a lip which terminates in spaced relation to the die plate.

7. A device for forming a mixture of moistened mineral feed ingredients into granules, comprising an apertured die plate, means for forcing the mixture through the apertures in the plate, and means associated with the plate in spaced relation to the same for limiting the length of the granules extruded through the apertures.

8. A device for forming a mixture of moistened mineral feed ingredients into granules, comprising an apertured die plate, means for forcing the mixture through the apertures in the plate, and means associated with the plate in spaced relation to the same for limiting the length of the granules extruded through the apertures, said means consisting of a finger which is movable in a plane generally parallel to the face of the plate.

9. A device for forming a mixture of moistened mineral feed ingredients into granules, comprising an apertured die plate, means for forcing the mixture through the apertures in the plate, and means associated with the plate in spaced relation to the same for limiting the length of the granules extruded through the apertures, said means consisting of an air jet which moves in a plane generally parallel to the face of the plate.

10. A device for forming a mixture of moistened mineral feed ingredients into granules, comprising an apertured die plate arranged in a substantially horizontal plane, means for forcing the mixture downwardly through the apertures in the plate under pressure, means for limiting the length of the granules extruded through the apertures, and means beneath the plate in closely spaced relation to the same for receiving the granules into which the mixture is shaped as it passes through the apertures.

In testimony whereof I have hereunto subscribed my name.

GROVER F. PFEIFFER.

moistened mineral feed ingredients into granules, comprising an apertured die plate arranged in a substantially horizontal plane, means for forcing the mixture downwardly through the apertures in the plate under pressure, means for limiting the length of the granules extruded through the apertures, and means beneath the plate in closely spaced relation to the same for receiving the granules into which the mixture is shaped as it passes through the apertures.

In testimony whereof I have hereunto subscribed my name.

GROVER F. PFEIFFER.

CERTIFICATE OF CORRECTION.

Patent No. 1,825,475.            Granted September 29, 1931, to

GROVER F. PFEIFFER.

It is hereby certified that error appears in the printed specification of the above numbered patent requiring correction as follows: Page 1, line 87, strike out the word "with"; and that the said Letters Patent should be read with this correction therein that the same may conform to the record of the case in the Patent Office.

Signed and sealed this 8th day of December, A. D. 1931.

(Seal)                                       M. J. Moore,
Acting Commissioner of Patents.

CERTIFICATE OF CORRECTION.

Patent No. 1,825,475.             Granted September 29, 1931, to

GROVER F. PFEIFFER.

It is hereby certified that error appears in the printed specification of the above numbered patent requiring correction as follows: Page 1, line 87, strike out the word "with"; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.